United States Patent
Szrek et al.

(10) Patent No.: US 10,115,097 B2
(45) Date of Patent: Oct. 30, 2018

(54) PROTECTING LOTTERY RECEIPTS

(76) Inventors: Irena Szrek, East Greenwich, RI (US); Walter Szrek, East Greenwich, RI (US)

( * ) Notice: Subject to any disclaimer, the term of this patent is extended or adjusted under 35 U.S.C. 154(b) by 1909 days.

(21) Appl. No.: 12/265,644

(22) Filed: Nov. 5, 2008

(65) Prior Publication Data

US 2009/0150290 A1 Jun. 11, 2009

Related U.S. Application Data

(60) Provisional application No. 60/985,391, filed on Nov. 5, 2007.

(51) Int. Cl.
*G06Q 20/20* (2012.01)
*H04L 9/32* (2006.01)

(52) U.S. Cl.
CPC ......... *G06Q 20/209* (2013.01); *H04L 9/3247* (2013.01); *H04L 2209/56* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 5,935,000 A * | 8/1999 | Sanchez et al. | 463/17 |
| 6,267,670 B1 * | 7/2001 | Walker et al. | 463/17 |
| 6,663,105 B1 * | 12/2003 | Sullivan et al. | 273/138.2 |
| 6,934,846 B2 * | 8/2005 | Szrek et al. | 713/180 |
| 6,958,014 B1 * | 10/2005 | Luciano et al. | 463/17 |
| 7,785,193 B2 * | 8/2010 | Paulsen et al. | 463/25 |
| 2003/0162591 A1 * | 8/2003 | Nguyen et al. | 463/29 |
| 2004/0032083 A1 * | 2/2004 | Walker et al. | 273/269 |
| 2004/0056416 A1 * | 3/2004 | Bennett, III | 273/269 |
| 2004/0182918 A1 * | 9/2004 | Meehan | 235/31 R |
| 2005/0001376 A1 * | 1/2005 | LaPorte et al. | 273/269 |
| 2005/0143162 A1 * | 6/2005 | Schneier et al. | 463/17 |
| 2005/0262338 A1 * | 11/2005 | Irwin, Jr. | 713/155 |
| 2006/0040726 A1 * | 2/2006 | Szrek et al. | 463/17 |

OTHER PUBLICATIONS

Bidgoli, "The Internet Encyclopedia," vol. 1 A-F, 2004, Wiley & Sons, Inc., Hoboken, NJ, pp. 526-534.*

* cited by examiner

*Primary Examiner* — Jacob C. Coppola
(74) *Attorney, Agent, or Firm* — Armstrong Teasdale LLP

(57) ABSTRACT

A method and system for generation of ticket security codes is provided. The method includes generating, by a host computing system, a lottery transaction authentication code for each transaction, generating an additional security code for the transaction, and including the generated additional security code on a lottery receipt for the transaction. The additional security code includes information that cannot be reproduced in the host computing system without access to the lottery ticket receipt and allows verification of critical data for the transaction.

12 Claims, 4 Drawing Sheets

PROTECTING LOTTERY RECEIPTS

BACKGROUND OF THE INVENTION

The field of the invention relates generally to the generation of ticket security codes.

At least some known lottery tickets/receipts are designed to enforce integrity of the tickets/transactions. Lotteries need to ensure that a lottery ticket, which is a bearer bond, is not falsified. Lottery system vendors introduce various techniques to enforce integrity of data on the ticket, to be able to verify that the ticket data was not altered, and protect against ticket fraud, for example, printing of falsified winning tickets. At least some known examples of enforcing security of ticket information include using specialized and numbered paper stock, special indicia printed on the ticket, double printing of particular information, unique security codes printed on the tickets and an independent verification system used to verify ticket information and these codes. These types of verification systems are work offline, separated from the on-line systems for selling lottery tickets.

At least some systems use security codes printed on lottery receipts combined with reliable printing to provide security for printing on non-dedicated and non-numbered paper stock. To protect against insiders fraudulently printing valid lottery tickets these security codes are designed so that they cannot be recreated even with access to the lottery system. The information kept on the online system is not sufficient data to recreate the codes. To protect the content of the ticket the security codes contain a "checksum" or "hash" of the ticket data, so the alteration of the ticket would result in a changed hash/checksum. In at least one known approach of creating these types of security codes is based on using secret information to create the codes. This secret information is transferred securely to the ticket verification systems. To enforce integrity and privacy of the transfer of secret information, different encryption methods are used.

In these known methods, based on the secret information kept in a lottery terminal, carry an additional risk. Because the terminals are not in controlled locations and use standard operating systems and languages, there is a possibility that the secret information could be compromised.

At least some known existing methodologies work in a conventional, closed environment, where specialized lottery terminals are used to create and safeguard secret information used for generation of these security codes. However, such known methods are not applicable to computing environments that include "thin" (e.g., HTML or Adobe Flash applications) clients where very little or no programming is done on the remote (terminal) end.

These and other known methods, including those based on secrets and requiring custom software, are not practical for use on foreign terminals or standard Point of Sales (POS) devices (e.g. checkout registers) as at least some lotteries want to have.

BRIEF DESCRIPTION OF THE INVENTION

In one aspect, a method is provided, including generating, by a host computing system, a lottery transaction authentication code for each transaction, generating an additional security code for the transaction, and including the generated additional security code on a lottery receipt for the transaction. The additional security code includes information that cannot be reproduced in the host computing system without access to the lottery ticket receipt and allows verification of critical data for the transaction.

DETAILED DESCRIPTION OF THE INVENTION

The subject of this invention is a novel and unique way of providing a solution for generation of ticket security codes.

In one embodiment, digital signatures are used as opposed to encryption and are applicable for both thin (e.g., HTML or Adobe Flash applications) and fat client (e.g., downloadable java) applications.

Aspects of the invention include a security method allowing for an on-line verification of ticket integrity. Also, receipts printed on third party terminals/printers may be secured and verified using embodiments of the invention.

Embodiments of the invention include generating security codes for lottery tickets/receipts where some of the ticket security code information printed on the receipt could not be recreated on the online lottery system but, once it was presented, it could be verified that the receipt was valid for an original transaction request.

While embodiments introduced in this invention are described with reference to lottery receipts, embodiments are also applicable for ensuring integrity of any other type of transactions where integrity and security of the receipt/ticket or token is critical.

While embodiments of the invention include a paper receipt of the lottery transaction, embodiments of the invention also apply to receipts in the form of bar code, electronic (computerized) receipts or any other media, internet betting or email based receipts.

While aspects of this invention are described with reference to random number generation, embodiments of the invention also apply to generation of the security codes in the form of character strings.

Figure 1:
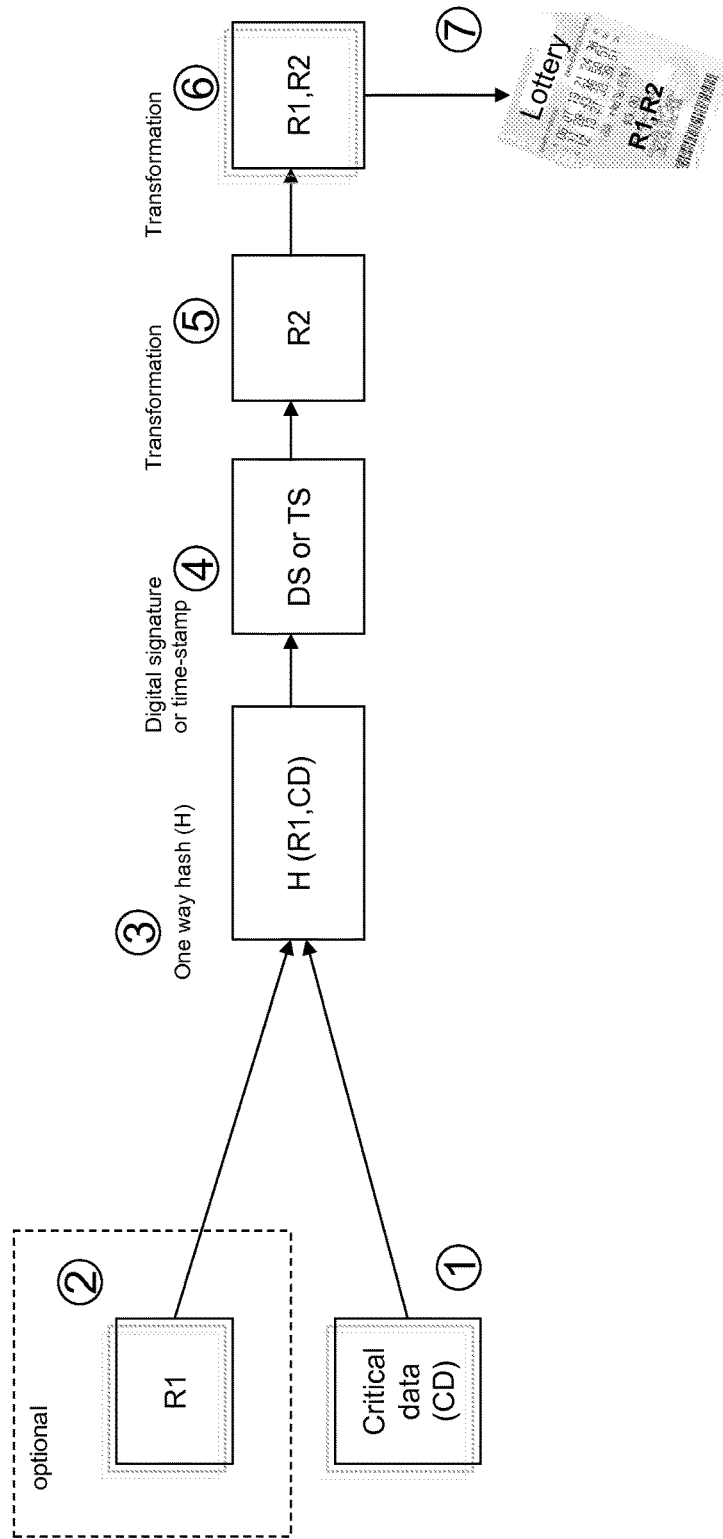
FIG. 1 shows a diagram depicting an exemplary embodiment of the generation of a ticket security code.

FIG. 1 shows a diagram depicting an exemplary embodiment of the generation of a ticket security code.

In one embodiment, in the first step, ticket critical data (CD) is collected. This data includes but is not limited to, bet combination, ticket price, product identification, agent information, player information, and transaction id.

One way hash of CD and optional random number R1 (or its one way hash), is generated. A single one way hash value may be generated for multiple transactions (many R1s and CDs) if a security code is requested for many different transactions.

In an alternative embodiment, optionally random number R1 is generated and its one way hash (H), e.g. SHA-1 or SHA-256, is calculated.

Digital signature DS or time-stamp TS of the hash is generated. One digital signature or time-stamp may be generated for multiple transactions (many R1s and CDs). Digital signature and information used to create a digital signature in plain or hashed form is stored on a persistent media at least one of, but not limited to, a disk drive and a tape drive. The information stored allows verification of the digital signature, critical data and optional R1.

A deterministic transformation of DS or TS is generated, creating R2. Multiple R2s are generated in case of multiple transactions requests from a single DS or TS. This and the previous step may be generated in a plurality of ways (e.g., according to U.S. Pat. No. 6,934,846, which is hereby incorporated by reference here for all purposes).

A transformation of R1 and R2 is generated as security code—R1,R2, one to twenty-four characters. In an alternative embodiment, for the electronic receipts, the security codes are longer than twenty-four characters.

In one embodiment, the security code is at least one of, but not limited to, printed on a lottery receipt as characters, printed on a lottery receipt as a barcode, and saved on an electronic receipt.

In another embodiment, the security code is embedded in a barcode. The use of a 2-D barcode allows a security code to be longer.

In yet another embodiment, the security code is embedded in an RFID or some other digitally readable media.

Figure 2:
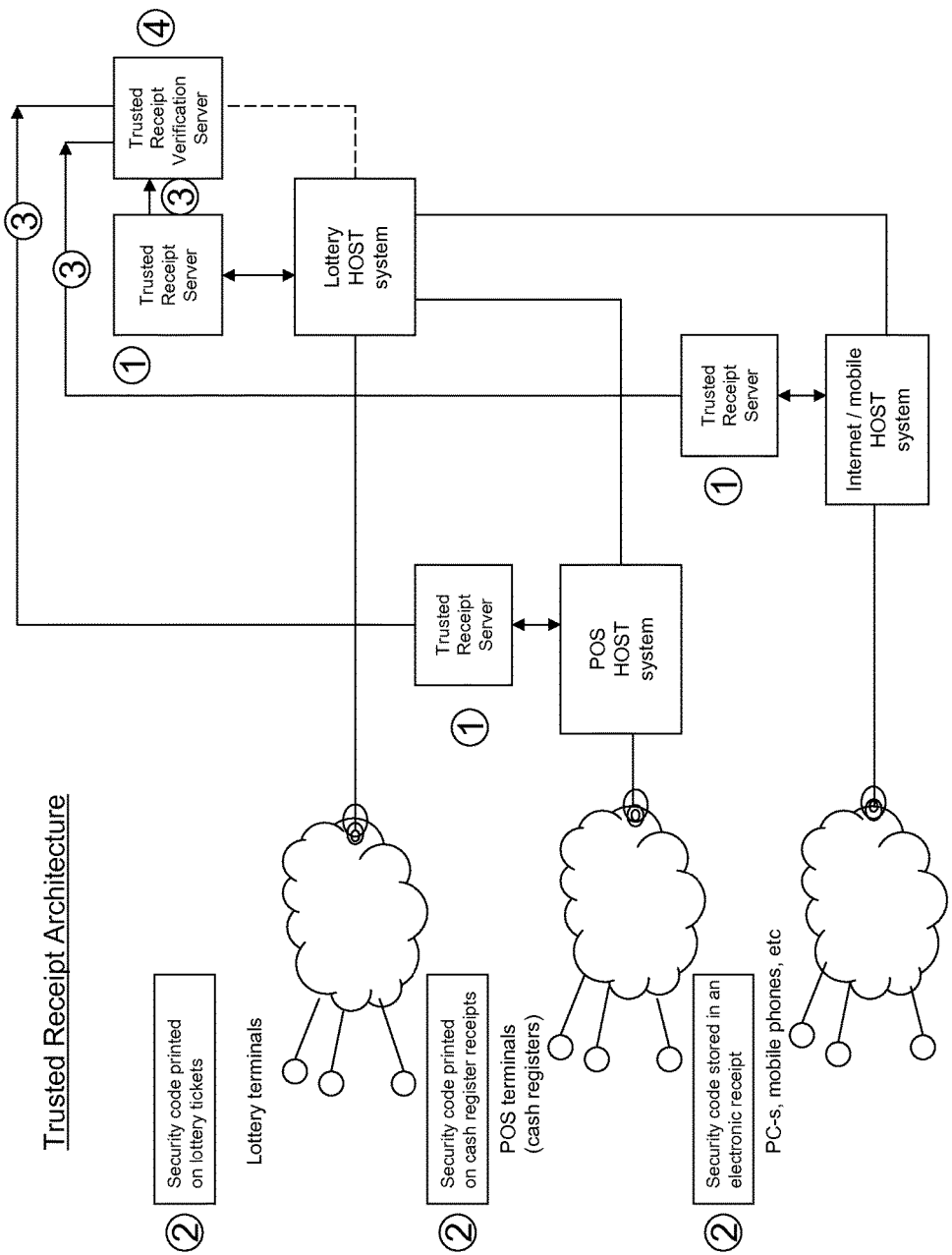
FIG. 2 shows a diagram depicting an exemplary embodiment of the trusted receipt architecture.

FIG. 2 shows a diagram depicting an exemplary embodiment of the trusted receipt architecture. As depicted, a Trusted Receipt Server generates a security code. A Trusted Receipt Server can be architecturally located in different places. A security code is printed on tickets or stored electronically. Critical ticket information and other data are transmitted to a Trusted Receipt Verification Server. The Trusted Receipt Verification Server verifies the security code.

In one embodiment, the stored information is included on the lottery transaction receipt and transferred to the verification server (e.g., the Trusted Receipt Verification Server).

In one embodiment, a digital signature server (e.g., Trusted Receipt Server) is used for generation of R2. To optimize performance, digital signature server signs together one or more receipts using a single signature and generates one or more random numbers R2, each R2 corresponding to a separate receipt. A special form of digital signature called time-stamping digitally signs not only data but also the time of signing.

In some embodiments, generation of random number R1 is not used. If used, R1 does not need to be "truly" random. For example, R1 may be information unique for this ticket. For example, R1 may be a cash register transaction identifier, or similar type of data. In an embodiment, R1 does not include any information that is stored, easily predictable or easily retrievable. Generation of random number R1 may be done at the POS terminal, 3rd party processor (e.g., POS Host system) gathering transactions from POS terminals, lottery host or digital signature server (e.g., Trusted Receipt Server).

To create R2, a deterministic transformation is used. The same transformation is repeated during the security code verification, where it should give the same result and a sufficient number of different outcomes for a specific application. Examples of such transformation are using parts of one way hash (e.g. SHA-1 or SHA-256) of the digital signature, using parts of digital signature directly, using outcomes of pseudo random algorithm seeded by parts of the digital signature. In an alternative embodiment, the generation of random number R2 is not used.

Figure 3:
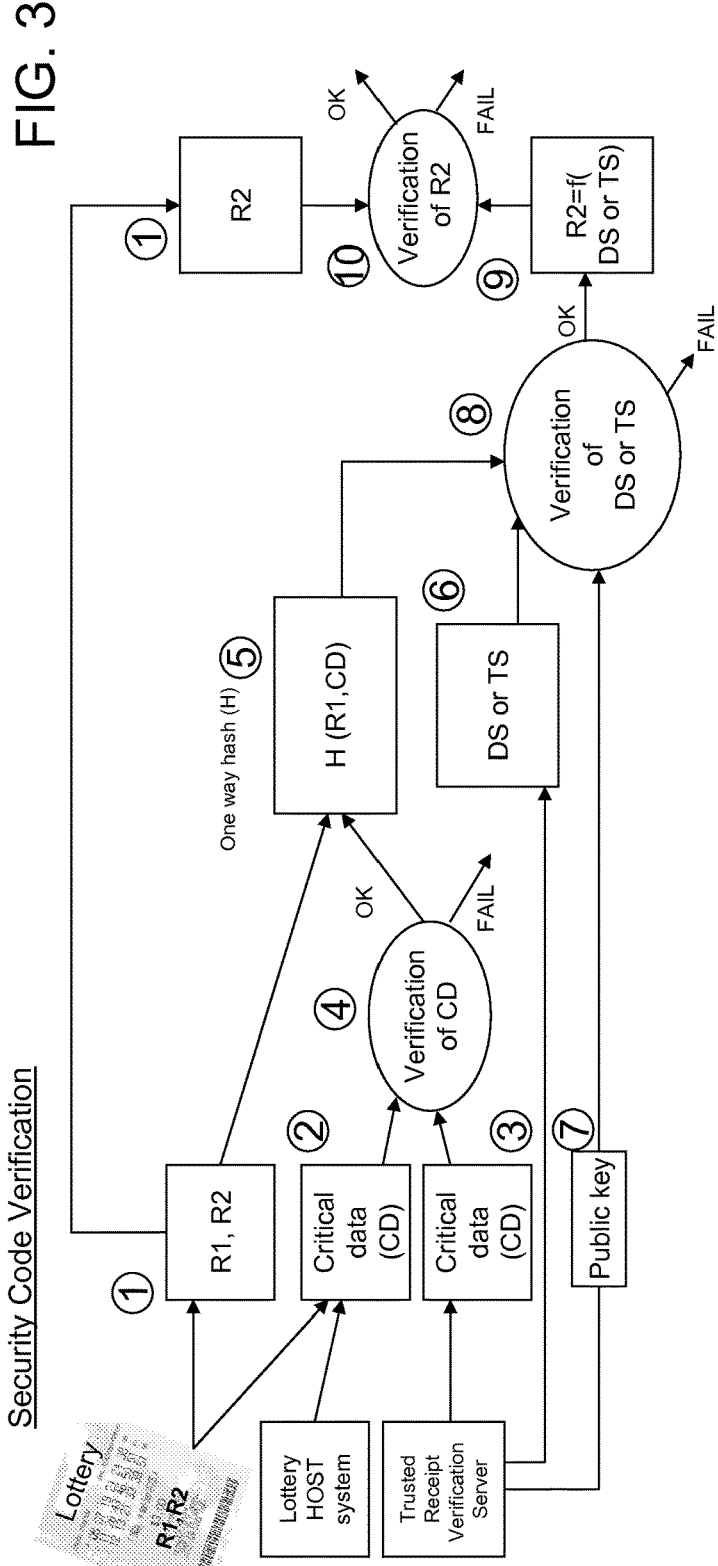
FIG. 3 shows a diagram depicting an exemplary embodiment of the process for verification of the validity of a lottery ticket.

FIG. 3 shows a diagram depicting an exemplary embodiment of the process for verification of the validity of a lottery ticket. As illustrated, a Security code is provided from the ticket—R1 and R2. Ticket critical data CD is provided from the ticket or Lottery system. CD is provided by the Verification Server. CD is compared to Trusted Receipt Verification system data; if the comparison fails, the ticket is invalid. Data on a Verification system can be in the form of a hash of the critical data. A one-way hash of R1 and CD is generated. In the case of multiple transactions, a one way hash of all transactions that were originally signed together is calculated (many R1s and CDs). Digital signature DS or time-stamp TS is obtained from Trusted Receipt Verification system. A public key corresponding to DS or TS is obtained by the Verification Server. The digital signature or time-stamp is verified using the public key corresponding to this signature. A deterministic transformation of DS or TS is generated, creating R2. R2 is compared with one entered from the lottery receipt. If the comparison fails, the ticket is invalid; otherwise it is a positive verification of the transaction.

In operation in the first step a security code is provided from the ticket—R1, R2.

The ticket critical data (CD) is provided from the ticket or lottery system. In one embodiment, all digitally signed critical ticket information is provided. The information is provided using at least one of, but not limited to, manual entry of the data off the ticket and electronically, e.g. from the lottery system if verification is to be done on-line in real time.

The CD data is provided by the Verification Server. The verification system retrieves data using, for example, one or more of the following: digital signature server transaction identifier, lottery transaction identifier, 3rd party processor transaction identifier, POS transaction identifier or using a hash of CD data content that may serve as transaction identifier.

The CD is compared to TR Verification system data. If the comparison fails (e.g., the data is different—CD differs from TR Verification system data), the ticket is invalid. The data on the Verification system may be in form of a hash of the critical data.

One way hash of R1 or one way hash of R1 and CD is generated. In case of multiple transactions, one way hash of all transactions that were originally signed together is calculated (many R1s or one way hashes of R1 and CDs).

A digital signature DS or time-stamp TS is obtained from TR Verification system.

A public key corresponding to DS or TS is obtained by Verification Server

A digital signature or time-stamp is verified using public key corresponding to this signature A deterministic transformation of DS or TS is used creating R2.

Transformation of generated R1 and R2 is compared with one entered from the lottery receipt. If comparison fails (e.g., the data is different from the lottery receipt), ticket is invalid. If the comparison succeeds, it is a positive verification of the transaction.

Figure 4:
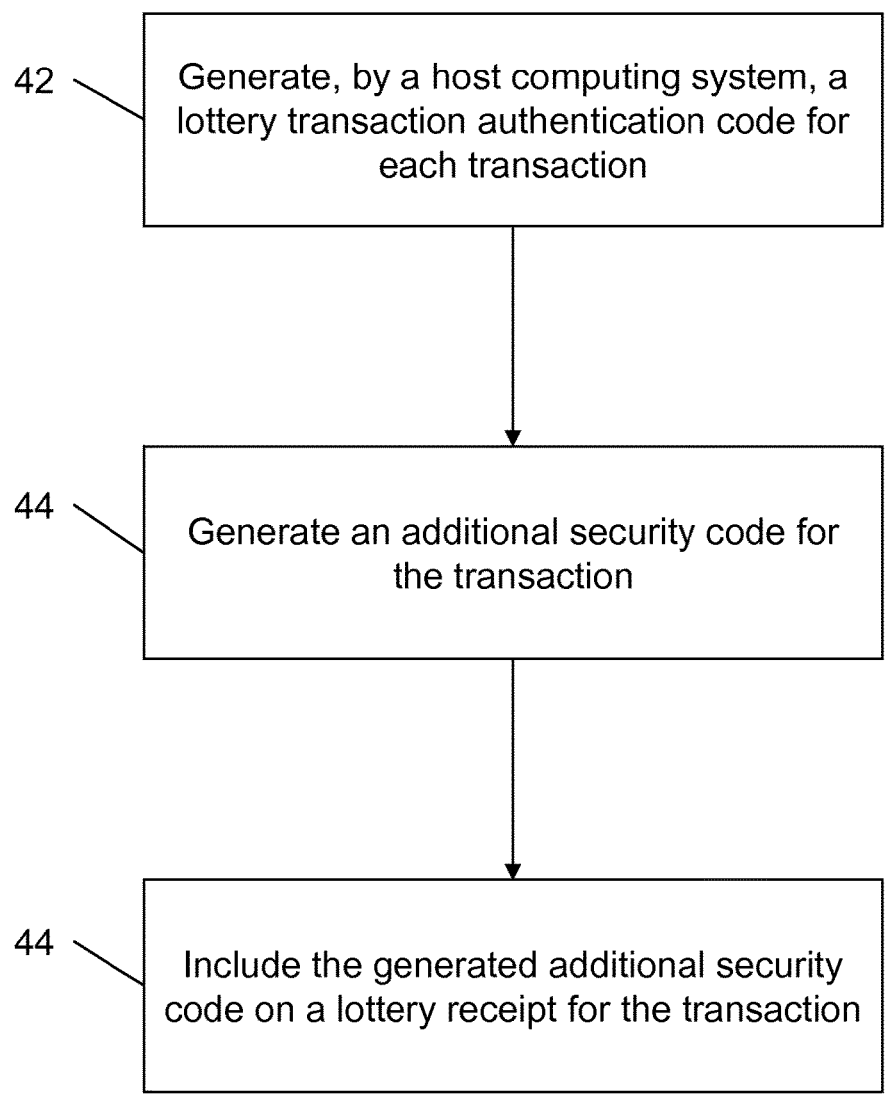
FIG. 4 shows a flowchart of a method of an exemplary embodiment for generation of ticket security codes.

FIG. 4 shows a flowchart of a method of an exemplary embodiment for generation of ticket security codes. The method includes generating 42, by a host computing system, a lottery transaction authentication code for each transaction, generating 44 an additional security code for the transaction, and including 46 the generated additional security code on a lottery receipt for the transaction. The additional security code includes information that cannot be reproduced in the host computing system without access to the lottery ticket receipt and allows verification of critical data for the transaction.

It is recognized that the customer receipts are provided by a variety of media. In one embodiment, they could be at least one of, but not limited to, printed on dedicated lottery terminals, POS (Point of Sales) devices, and stored electronically, in at least one of, but not limited to, an email, an SMS to mobile device and any other media providing receipt for a player transaction.

Exemplary Operating Environment

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

A method of generation of lottery transaction authentication codes is contemplated. An additional security code is generated and provided on the lottery receipts. This security code allows verification of the transaction critical data. In addition to enabling verification, standard lottery receipt information security code contains information that cannot be reproduced in the host computing system without the access to lottery ticket receipt. This method involves using digital signatures.

A method of generation of a security code on the lottery receipt is contemplated. An independent security server digitally signs the critical lottery transaction information which may comprise one or more of the following elements:
  a. Transaction value
  b. Transaction Identifier
  c. Date
  d. Time
  e. Bet type
  f. Bet details
  g. Game instance data
  h. Product identifier
  i. Lottery agent identifier
  j. Player Identifier
  k. Clerk identifier A method of generation of security code is contemplated where there is additional information provided on the lottery receipt that is either not stored in a host lottery system or stored as one way hash of this information and this information or its one way hash is digitally signed or time-stamped.

A method is contemplated where this additional information may be one or more of the following:
  a. Random number, where random number may be generated in the POS device, 3rd party processor, lottery system or a signing or time-stamping system
  b. Cash register receipt identifier
  c. Clerk identifier A method is contemplated to generate a single digital signature or timestamp of the input data for one or more transactions, A method of generation of an auditable random number out of digital signature according to U.S. Pat. No. 6,934,846 is contemplated.

It is contemplated to provide on a transaction receipt a complete or a part of the random number generated.

It is contemplated to convert random number generated before providing it fully or in part on the lottery receipt.

Conversion that is accomplished on either the POS device, lottery terminal, digital signature server, lottery system or 3rd party processor is contemplated.

A method to provide a security code where the security code is embedded in the machine readable media such as barcode or RFID is contemplated.

A system to verify security code is contemplated.

A system that would operate off-line, and that would allow verification of digitally signed data and verification of the part of or complete random number is contemplated.

A method implemented on the system to provide a digital signature and security code and critical transaction information data and to verify security code and digital signature of the data is contemplated.

A system that operates on-line, and that allows verification of digitally signed data and verification of a part of a or a complete random number is contemplated.

A method implemented on the system to provide a digital signature and security code and critical transaction information data and to verify the security code and digital signature of the data is contemplated.

A method is contemplated including generating, by a host computing system, a lottery transaction authentication code for a transaction. The method also includes generating an additional security code for the transaction. The method also includes including the generated additional security code on a lottery receipt for the transaction. The additional security code includes information that cannot be reproduced in the host computing system without access to the lottery ticket receipt. The additional security code also allows verification of critical data for the transaction.

What is claimed is:

1. A method for enabling verification of validity of a lottery receipt, said method comprising:
  generating, by a point of sale device or a point of sale remote system, including a processor coupled to a memory device, a first code that is not accessible by a host computing system, the first code comprising a random number;
  calculating, by the point of sale device or the point of sale remote system, a one way hash of the first code;
  receiving, by the host computing system, the one way hash of the first code;
  generating, by the host computing system, a second code for the lottery transaction, wherein the second code comprises information based on one of a digital signature or a digital timestamp;
  receiving, by the point of sale device or the point of sale remote system, the second code;
  generating, by the point of sale device and/or point of sale remote system, a security code as a transformation of the first code and the second code; and
  including the security code on a lottery receipt.

2. The method of claim 1, further comprising:
  selecting bet transaction information, said transaction information comprising at least one of the following: a transaction value, a transaction identifier, a date, a time, a bet type, details of a bet, game instance data, a product identifier, a lottery agent identifier, a player identifier, and a clerk identifier; and
  creating a digital signature by the host computing system or an independent security server, one or more of said transaction information and a one way hash of the first code received by the host computing system;
  wherein the second code is derived from said digital signature.

3. The method of claim 2, further comprising:
  storing, for verification, the digitally signed or time-stamped calculated one-way hash of said first code; and
  storing said digital signature or timestamp.

4. The method of claim 3, further comprising:
  determining the security code using information from the bet receipt;
  determining the one-way hash of said first code from the bet receipt; and
  determining whether the determined security code corresponds to the second code received by the point of sale device or the point of sale remote system and whether the determined one-way hash matches the stored one-way hash.

5. The method of claim 3, wherein said second code comprises an auditable random number generated from the digital signature, said auditable random number comprising more than one digit.

6. The method of claim 5, wherein the lottery receipt further comprises at least a part of the auditable random number.

7. The method of claim 2, further comprising:
  selecting additional information, said additional information comprising at least one of the following:

a. a random number, wherein said random number is generated by at least one of the following: a third party processor, a lottery system, and a signing or time-stamping system,
b. a cash register transaction identifier, and
c. a clerk identifier;
digitally signing or time-stamping the said additional information; and
storing, for verification, the digitally signed or time-stamped additional information,
wherein the lottery receipt further comprises the digitally signed or time-stamped additional information.

8. The method of claim 7, further comprising:
determining the security code using information from the lottery receipt;
acquiring the digitally signed or time-stamped additional information from the lottery receipt; and
determining whether the determined security code corresponds to the second code on the lottery receipt and whether the acquired digitally signed or time-stamped additional information matches the stored digitally signed or time-stamped additional information.

9. The method of claim 2, wherein the digital signature is configured to be capable of signing an additional transaction information that is different from the selected bet transaction information.

10. The method of claim 2, wherein the lottery receipt further comprises an embedded machine-readable security code.

11. The method of claim 10, wherein the embedded machine-readable security code comprises a security code embedded as at least one of the following: a barcode and a radio frequency identification.

12. The method of claim 2, further comprising:
determining the security code from the bet receipt; and
determining whether the determined security code corresponds to the second code.

* * * * *